United States Patent [19]

Shiba

[11] 4,387,823
[45] Jun. 14, 1983

[54] MAGNETIC TAPE CASSETTE
[75] Inventor: Haruo Shiba, Sakushi, Japan
[73] Assignee: TDK Electronics Co., Ltd., Tokyo, Japan
[21] Appl. No.: 246,884
[22] Filed: Mar. 23, 1981
[30] Foreign Application Priority Data
Mar. 25, 1980 [JP] Japan .............................. 55-38215[U]
[51] Int. Cl.³ .......................... B65D 6/00; G03B 1/04; G11B 15/32
[52] U.S. Cl. ...................................... 220/4 R; 242/199
[58] Field of Search .................... 206/387; 220/4 R, 3; 242/199; 229/3.5 R, 1.5 B

[56] References Cited
U.S. PATENT DOCUMENTS
3,661,294  5/1972  Pearson et al. ........................ 220/3
4,267,986  5/1981  Uemura et al. ..................... 242/199
4,299,349  11/1981 Gilden .............................. 229/1.5 B Primary Examiner—William T. Dixson, Jr.
Attorney, Agent, or Firm—Wyatt, Gerber, Shoup, Scobey & Badie

[57] ABSTRACT

A magnetic tape cassette including an intermediate frame which has flat upper and under surfaces in parallel and provides a sufficient space therein to hold a length of magnetic tape, and substantially flat top and bottom plates fastened, respectively, to the flat upper and under surfaces of the intermediate frame, characterized in that said intermediate frame is made of a composite resin material which comprises an unsaturated polyester resin and a thermoplastic polymer containing from 50 to 75% by weight of calcium carbonate and glass fiber on the basis of the total resin weight, the intermediate frame having a linear expansion coefficient in the range from $1 \times 10^{-5}$ to $3 \times 10^{-5}/°C.$, said calcium carbonate and said glass fiber being used in a ratio by weight of from 60:10 to 40:30.

15 Claims, 1 Drawing Figure

MAGNETIC TAPE CASSETTE

BACKGROUND OF THE INVENTION

This invention relates to magnetic tape cassettes, and more specifically to improvements in a magnetic tape cassettes comprising an intermediate frame and clear top and bottom plates.

The present applicant previously proposed a magnetic tape cassette having a case composed of a metallic intermediate frame and clear plastic plates fastened to the upper and under surfaces of the frame. (Japanese Utility Model Application No. 126245/1977) The intermediate frame of die-cast aluminum or the like keeps the clear top and bottom plates from being deformed thermally or otherwise, for example, with molding strains, ensuring very smooth winding and unwinding of the magnetic tape. It eliminates the usual causes for off-track recording or playback, irregular reeling of the tape, variations in the reproduction output, and other troubles. However, the metal working such as die casting of aluminum takes much time and labor and, moreover, calls for additional, complicate processes for surface finish, improved corrosion resistance, etc. On the other hand, the ordinary magnetic tape cassettes in wide use, which does not use the sandwich structure but a pair of plastic half cases fastened together, pose the problems of molding strains and thermal deformation. These and other shortcomings made the two-member cassettes unsuitable for applications where accuracy is the prime consideration. In other applications, also, there are additional difficulties.

BRIEF SUMMARY OF THE INVENTION

The present invention has for its object to provide a magnetic tape cassettes which compare favorably in dimensional accuracy with the cassettes of the sandwich structure using a metallic intermediate frame, while retaining the advantages of plastic molding. Briefly, the invention resides in a magnetic tape cassettes having a case composed of an intermediate frame and (preferably clear) plastic top and bottom plates fastened together, characterized in that the intermediate frame is made of a composite resin material which comprises an unsaturated polyester resin and a thermoplastic polymer containing from 50 to 75% by weight of calcium carbonate and glass fiber on the basis of the total resin weight.

The intermediate frame according to the invention has a low thermal expansion coefficient and maintains good dimensional accuracy because of negligible expansion and shrinkage at the time of molding. In addition, it possesses sufficient rigidity and strength to keep the both top and bottom plates securely attached thereto, correcting any molding strains or thermal deformation during use of those plates and thereby conferring high dimensional accuracy and stability on the resulting magnetic tape cassette. With good surface properties the intermediate frame gives fine outward appearance and enhances the merchandise value of the product. It has been observed that in preparing a composite composition in which the thermoplastic resins according to this invention were reinforced with glass fiber alone, that is, without calcium carbonate, the frame so obtained manifested very poor surface quality. Under the invention there is no such drawback.

As regards the proportions of the two different resins to be employed in the invention, the use of at least 24% by weight (on the basis of the combined resin weight) of the unsaturated polyester resin gives good result, but this ratio should not be deemed critical. The mixing ratio of glass fiber to calcium carbonate need not be very exact, either; a generally desirable range is approximately from 10:60 to 30:40. Greater importance is attached, however, to the combined percentage of those fillers and it should range from 50 to 75% by weight on the basis of the total resin weight. The composition thus obtained imparts the desirable thermal expansion coefficient and surface quality to the product.

DETAILED DESCRIPTION OF THE INVENTION

Figure 1:
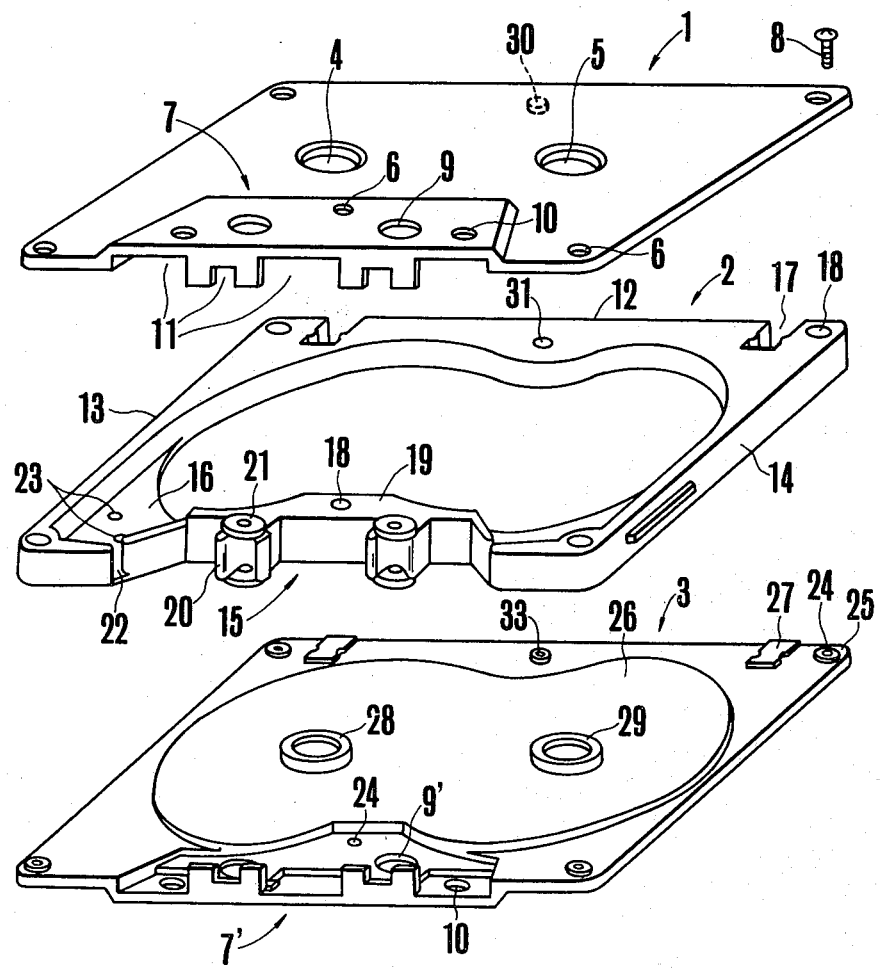
FIG. 1 is an exploded view of a magnetic tape cassette embodying the present invention.

An embodiment of the invention will now be described in detail. FIG. 1 shows in an exploded view a magnetic tape cassette of the invention comprising a top plate 1, an intermediate frame 2, and a bottom plate 3, in the descending order. The top and bottom plates 1, 3 are formed of a plastic material, preferably of a transparent type. They are both securely fastened to the intermediate frame 2 at several points by machine screws 8. The enclosure or case assembled in this way will contain in its space tape hubs, a length of magnetic tape, guide rollers, guide pins, and other well-known components which are not shown for the sake of simplicity.

The top plate 1 is a substantially flat plate having a pair of holes 4, 5 formed in spaced relation near the center to receive shafts for driving the tape hubs. These holes are tapered so that their inlet ends are larger in diameter than the outlet ends. Countersunk holes are formed in the four corners and in a bulge 7 on the upper surface of the plate to receive machine screws 8 for fastening the plate and the two other members together. The bulge 7 is formed with capstan holes 9 and holes 10 for guide pins, which serve also as aligning and matching means at the time of assembling. Along its outer edge the bulge has projections normal to its plane, defining recesses or windows 11 to permit the magnetic tape to be operatively brought into and out of contact with the drives of a cassette recorder not shown. These openings 9 to 11 are all provided in standardized locations. At a rear middle point of the under surface of the top plate is formed a lug 30 for precise alignment of the plate with the intermediate frame.

The intermediate frame 2 is formed of the above-mentioned composite resin material. To be more exact, it is made by filling and mixing an unsaturated polyester resin and a thermoplastic polymer with from 50 to 75% by weight on the basis of the total resin weight of fine calcium carbonate powder and glass fiber and then forming the mixture by conventional plastic molding techniques to the shape shown in FIG. 1. By way of example, a practical mixture for this use may have the following composition:

| | |
|---|---|
| Unsaturated polyester | 24.0% |
| Styrene monomer | 2.4 |
| Calcium carbonate | 60.0 |
| Glass fiber | 10.0 |
| Catalyst | 0.2 |
| Others including mold releasing agent | 3.4 |

Generally rectangular in shape, the intermediate frame provides a sufficient space to hold a roll of magnetic tape. It consists of a long side portion 12, two short side portions 13, 14, and a front side portion 15. The long and short side portions extend with the both upper and under surfaces in parallel planes. Both ends or wings of the front portion 15 also have upper and under surfaces extending in the same parallel planes. As can be seen from FIG. 1, thin webs 16 extend inwardly from the under surfaces of both front corners where the side portions 13, 14 meet both wings of the front portion. With these webs the frame forms a large center opening in an epitrochoid form, with two circles drawn about the driving shaft holes of the top and bottom plates 1, 3 and the overlapping portions rounded or otherwise smoothly connected. The webs provide reinforcements for the thin portions of the intermediate frame and generally match the frame with the bottom plate 3. The under surfaces of the webs 16 are flush with those of the side portions. Near both ends of the long side portion 12 are formed a pair of recesses 17 to provide record-defeat tabs. Through all corners of the side portions are also formed loose holes 18 corresponding to the countersunk holes 6 of the top plate 1.

The middle portion of the front side portion 15, which corresponds to the bulge 7 of the top plate 1, has a part 19 with a greater wall thickness than the rest. The parallel upper and under surfaces of this part constitute bearing faces to contact the inner surfaces of the bulges of the top and bottom plates 1, 3. The thick-walled part 19 is also formed with a loose hole 18. As has been indicated with the bottom plate 3, the manner in which the under bearing face of the part 19 contacts the underlying surface will be obvious to those skilled in the art. From the front face of the thick-walled part 19 extend bifurcated guide projections 20 which terminate with vertical forward edges. Rings 21 are formed integrally with the upper and lower ends of the projections to constitute accurate guide means for the magnetic tape. The two bifurcated guide projections 20 support the magnetic tape at four points and, molded with high dimensional accuracy, serve as precise, positive guides for the tape. The rings 21 have holes to receive a capstan, the outside diameter being such that the rings fit exactly in the holes 9, 9' of the top and bottom plates. The front side portion 15 includes slots 22 formed in both wings for the passage of magnetic tape. Blind holes 23 to support one ends of shafts of guide rollers are formed in the webs 16, close to the slots 22. Although not shown, the top plate also has blind holes at points corresponding to the holes 23. The long side portion 12 has a through hole 31 formed in alignment with the lug 30 of the top plate for precise engagement, the lower half of the hole allowing an upwardly protruding lug 33 of the bottom plate to fit in exactly.

Like the top plate 1, the bottom plate 3 is a substantially flat member of a clear plastic. At the four corners and in the center of the bulge 7' of the bottom plate are formed screw holes 24 aligned with the countersunk holes 6 of the top plate and the loose holes 18 of the intermediate frame. Where necessary, the surrounding walls of these screw holes at the corners may be projected in the form of rings 25, which will fit in annular recesses (not shown) formed around the corresponding loose holes of the intermediate frame 2 for the purposes of guiding and, to some degree, of alignment. Protuberances 27 are also formed on the bottom plate, at points where they fit in the recesses 17 to be provided with the record-defeat tabs. In addition, there is formed a land 26 corresponding in shape to the epitrochoidal center opening of the intermediate frame 2. Through holes 28, 29, which face, respectively, the holes 4, 5 of the top plate 1, have on their upper ends annular collars into each of which the hub for tape (not shown) is to be loosely inserted.

It should be noted that the inner ends of the holes 4, 5 of the top plate, too, are provided with similar annular collars. The front side portion 7' is substantially the reverse in configurations to the front portion 7 of the top plate, and its exterior structure may be regarded as identical with that of the top plate 1. Conversely, the interior structure of the front portion of the top plate may be deemed the same as that of the front portion 7' of the bottom plate.

With the construction described, the components are assembled together in the following way. Hubs on which the magnetic tape is wound are fitted around the holes 28, 29 of the bottom plate, and the intermediate frame is placed on the bottom plate, when the two components are accurately aligned because the rings 21 fit in the holes 9' and the upright tab 33 fits into the matching hole 31. Next, the top plate 1 is put on the upper surface of the intermediate frame, when the two are precisely aligned by guide means, that is, as the rings 21 fit in the holes 9 and the lug 30 in the matching hole 31. Machine screws 8 are then inserted into the holes and tightened to align and assemble the three components together. Any molding strain or other deformation the top and bottom plates may have will be corrected by the flat upper and under surfaces of the intermediate frame, and the two plates will be kept in a perfectly parallel relation. Moreover, the intermediate frame permits the cassette to retain proper dimensional stability against thermal, mechanical, and other impacts which may be given from the outside.

In the magnetic tape cassette assembled in the manner described, the intermediate frame has a low linear expansion coefficient in the range of about 1 to $3 \times 10^{-5}/°C$. (the value depending upon the proportions of the fillers used). In this respect the frame has been found substantially equivalent to the die-cast aluminum one whose coefficient is about $2.4 \times 10^{-5}/°C$. The frame surface is much smoother than that of the frame formed of a composition containing glass fiber as the only filler. Magnetic tape cassettes made by way of experiment with this intermediate frame exhibited no deformation on repeated fluctuations in temperature in cycles from $-20°$ C. to $+90°$ C. They exhibited no trace of molding strain and showed good dimensional accuracy and stability. They compare well in these points to the cassettes employing die-cast aluminum intermediate frames, with an additional advantage of being lighter in weight.

According to the present invention, a magnetic tape cassette is obtained which is improved in accuracy of assembly, has no variation in sensitivity, and exhibits increased tape running stability. There is no off-track or out-of-phase recording or playback. Use of clear top and bottom plates makes possible direct observation of the tape being paid out and taken up and also reduction of the overall weight to a minimum.

Unsaturated polyester is a prepolymer consisting of condensate of glycol and unsaturated dibasic acid or condensate of glycol and a mixture of saturated and unsaturated dibasic acid. Glycol may include ethyleneglycol, propyleneglycol, 1,4-butandiol, diethyleneglycol, triethyleneglycol and the like. Unsaturated dibasic acid may include maleic acid, fumaric acid, itaconic acid and the like and saturated dibasic acid may include phthalic acid, isophthalic acid, terephthalic acid and the like. Thermoplastic polymer is also used and vinyl monomer such as styrene is used to obtain the thermoplastic polymer. A catalyst such as peroxide including benzoylperoxide, tert-butylperbenzoate and the like is used to polymerize the vinyl monomer per se and with the prepolymer. Glass fiber used has a diameter of about 10-20μ and a length of 1-6 mm.

What I claim is:

1. A magnetic tape cassette including an intermediate frame having flat upper and lower parallel surfaces providing sufficient space therein to hold a length of magnetic tape, and substantially flat top and bottom plates fastened, respectively, to the flat upper and lower surfaces of the intermediate frame, characterized in that said intermediate frame comprises a composite resin material containing an unsaturated polyester resin and a thermoplastic polymer containing from 50 to 75% by weight of calcium carbonate and glass fiber on the basis of the total resin weight.

2. A cassette in accordance with claim 1, wherein said intermediate frame has a linear expansion coefficient of from $1 \times 10^{-5}$ to $3 \times 10^{-5}/°C$.

3. A cassette in accordance with claims 1 or 2, wherein said calcium carbonate and said glass fiber are used in a ratio by weight of from 60:10 to 40:30.

4. A magnetic cassette comprising a rectangular intermediate frame, said frame having a long rear portion and a pair of reinforcing webs connecting the adjacent ends of the side portions and said front portion; said rear portion, said side portion and a part of said front portion having common top and bottom flat surfaces in parallel, the bottom surface of said webs being flush with said bottom flat surface; the inner walls of said rear, sides and front portions and the upper surface of said webs defining a cassette tape-containing space; a top plate and a bottom plate each of a plastic material in the form of substantially flat plates, means fastening said plates together with said intermediate frame there between along said top and bottom flat surfaces to thereby close said space; and means for aligning said intermediate frame with said top and bottom plates, said aligning means including an opening in said frame, said opening being defined by said inner walls and the inner edges of said webs, and a land formed on one of said plates, said land being fitted within said opening, said intermediate frame characterized in that it comprises a composite resin material containing an unsaturated polyester resin and a thermoplastic polymer containing from 50 to 75% by weight of calcium carbonate and glass fiber on the basis of the total resin weight.

5. A cassette in accordance with claim 4 wherein said land is disposed on and forms part of said bottom plate, the upper surface of said land being substantially flush with the upper surface of said webs.

6. A cassette in accordance with claim 4 wherein said aligning means includes rings on the top and bottom surfaces of said intermediate frame, said plates having mating holes, said rings cooperating with said mating holes in said top and bottom plates.

7. A cassette in accordance with claim 5 wherein said aligning means includes rings on the top and bottom surfaces of said intermediate frame, said plates having mating holes, said rings cooperating with said mating holes in said top and bottom plates.

8. A cassette in accordance with claim 4 wherein said intermediate frame further includes a pair of guides in the form of bifurcated projections extending forwardly of said frame for contact with a magnetic tape, vertical forward edges of said projections providing guide means for the tape.

9. A cassette in accordance with claim 4 wherein the upper surface of said land is on said bottom plate and substantially flush with the upper surface of said webs.

10. A cassette in accordance with claim 9 wherein said aligning means also includes rings on the top and bottom surfaces of said intermediate frame, said rings cooperating with mating holes formed in said top and bottom plates 11. A cassette in accordance with claims 4, 5, 6, 7, 8, 9 or 10 wherein said intermediate frame has a linear expansion coefficient of from $1 \times 10^{-5}$ to $3 \times 10^{-5}/°C$.

12. A cassette in accordance with claims 4, 5, 6, 7, 8, 9, 10 or 11 wherein said calcium carbonate and said glass fiber are used in a ratio by weight of from 60:10 to 40:30.

13. A magnetic tape cassette which comprises: a rectangular intermediate frame having a long rear portion, a pair of shorter side portions and a front portion; said rear portion, said side portions and a part of said front portion having parallel top and bottom flat surfaces; the inner walls of said rear, sides and front portions defining a cassette tape-containing opening which extends through said frame; said opening corresponding generally to the shape of the numeral 8; a top plate and a bottom plate of a plastic material in the form of substantially flat plates fastened to opposite surfaces of said intermediate frame to close one side of said cassette tape-containing opening; means for aligning said intermediate frame with respect to each of said top and said bottom plates, said means including a land formed on said bottom plate and fitted in said opening, the height of said land being less than the thickness of said frame; said land having first and second means for alignment with tape hubs, said intermediate frame characterized in that it comprises a composite resin material containing an unsaturated polyester resin and a thermoplastic polymer containing from 50 to 75% by weight of calcium carbonate and glass fiber on the basis of the total resin weight.

14. A cassette in accordance with claim 13 wherein said intermediate frame has a linear expansion coefficient of from $1 \times 10^{-5}$ to $3 \times 10^{-5}/°C$.

15. A cassette in accordance with claims 13 or 14 wherein said calcium carbonate and said glass fiber are used in a ratio by weight of from 60:10 to 40:30.

* * * * *